June 30, 1942.　　A. L. HOLCOMB　　2,288,241
PROTECTIVE DEVICE
Filed March 1, 1940
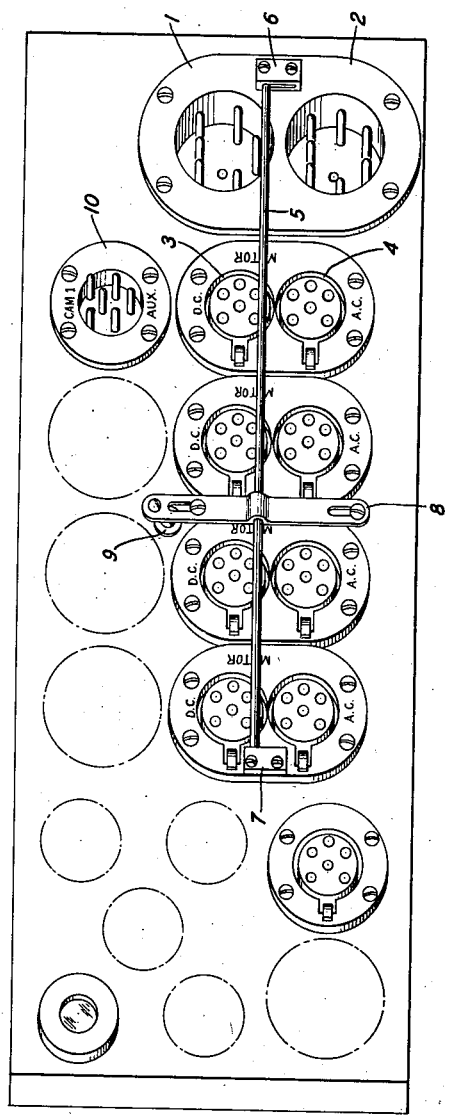
INVENTOR
A.L. HOLCOMB
BY
G.H. Heydt.
ATTORNEY Patented June 30, 1942

2,288,241

UNITED STATES PATENT OFFICE 2,288,241

PROTECTIVE DEVICE

Arthur L. Holcomb, Tarzana, Calif., assignor to Western Electric Company, Incorporated, a corporation of New York Application March 1, 1940, Serial No. 321,665

1 Claim. (Cl. 175—298)

This invention relates to a protective device or guard for electrical receptacles to prevent the insertion of a plug in a receptacle which is temporarily unsuited for use.

The object of the invention is to render certain receptacles in a group of receptacles available for use and simultaneously to prevent the use of the other receptacles in the group.

A feature of the invention is a movable member adapted in one position to render available certain of the receptacles in one group and at the same time to render unavailable the receptacles in another group, and in another position to render the first group of receptacles unavailable for use and to render the second group of receptacles available.

Another feature of the invention is an electrical switching means associated with the movable member in such manner that in one position of the movable member, the switching means will be operated and in the other position of the movable member the switching means will be non-operated.

The drawing shows in plan view a typical embodiment of the invention.

The invention is applicable to any junction box or control cabinet to which two different types of electrical power may be supplied and from which a plurality of power operating devices obtain their supply of power.

The invention is peculiarly applicable to the multiduty motor system which I have described in an article entitled "A multiduty motor system," published in the Journal of the Society of Motion Picture Engineers, volume XXXIV, January, 1940, commencing at page 103. In this multiduty motor system a plurality of motors driving motion picture cameras and sound recorders are supplied with power through a control cabinet. The control cabinet may be supplied with alternating current or with direct current. Separate receptacles are provided for connecting the power supply source to the control cabinet as indicated by receptacles 1 and 2 in the drawing. Separate receptacles, one for each type of power, are supplied for each of the motors associated with the cabinet. A movable member 5, slidingly supported in the abutments 6 and 7, is so associated with the receptacles that in order to plug the alternating current into the receptacle 2, the movable member 5 must be moved upward thus permitting the insertion of the plug from the motor in the receptacle such as 4, associated with the alternating current supply receptacle, but preventing the insertion of any of the motor plugs into any of the direct current receptacles such as 3, and also preventing the insertion of the direct current power supply plug into the receptacle 1. The member 5 may conveniently be moved by means of the member 8 slidingly supported upon suitable standards. The movement of the slidable member 8 also controls the operation of a switching means 9, which may be used to adapt the circuit of the control cabinet for the type of power being used.

The receptacle 10 associated with each motor connects certain control devices associated with the motor to the circuit of the control cabinet, and the other circles indicate other receptacles and fuses associated with the control cabinet.

The receptacles may be of the type known commercially as "Cannon plugs," and shown in U. S. Patent 2,000,318, May 7, 1935, J. H. Cannon, but any other suitable type of receptacle may be used.

What is claimed is:

In a control cabinet, a plurality of power supply receptacles, a plurality of groups of distribution receptacles each group of distribution receptacles being aligned with one of the power supply receptacles, a slotted abutment at each end of the line of receptacles, and a slidable bar supported in said slotted abutment and so disposed that in one position the said bar will partially cover and render inoperative one group of said receptacles and in the other position will partially cover and render inoperative the other group of said receptacles.

ARTHUR L. HOLCOMB.